Aug. 11, 1942.　　　　P. H. JONES　　　　2,292,838
METHOD AND APPARATUS FOR IMPARTING DIRECTIONAL
MAGNETIC PROPERTIES TO CORE SAMPLES
Filed Dec. 6, 1938
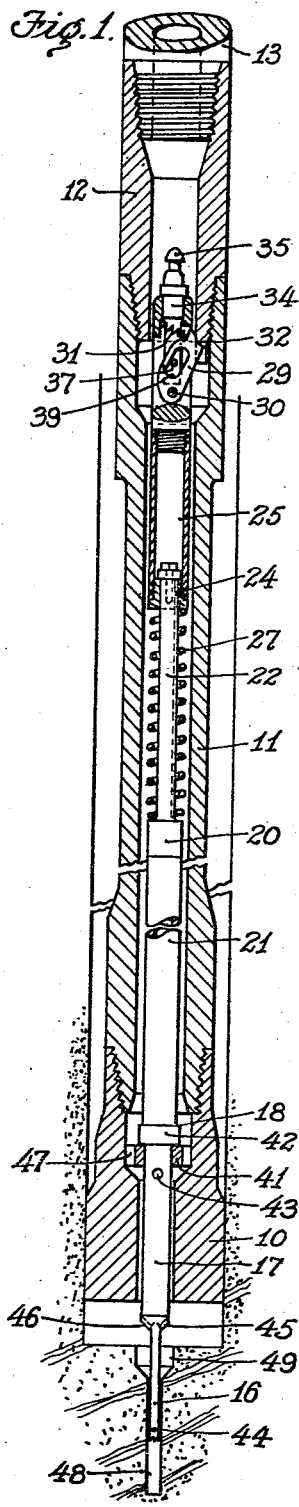
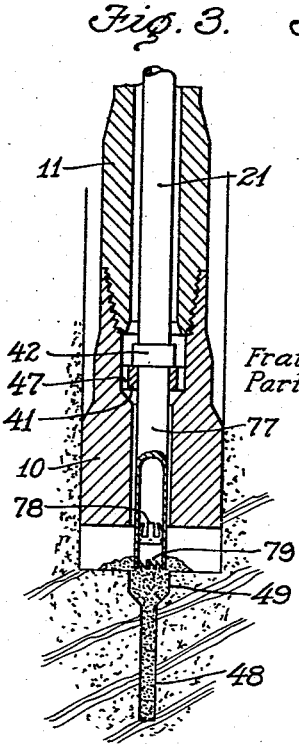
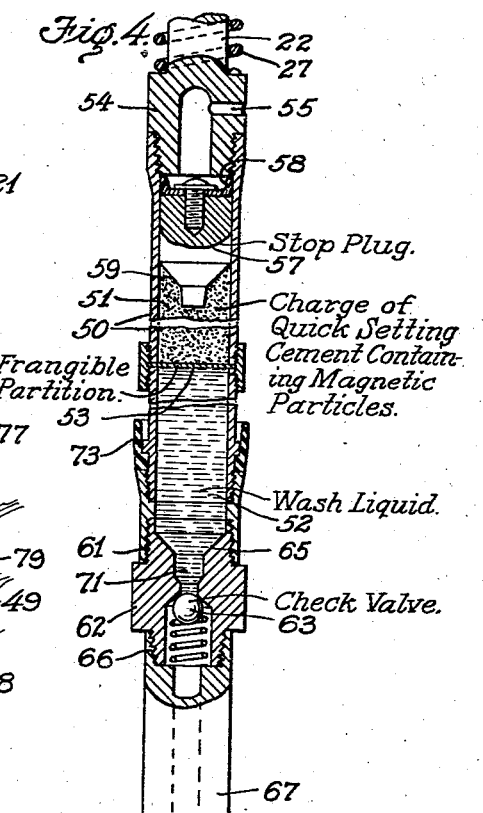
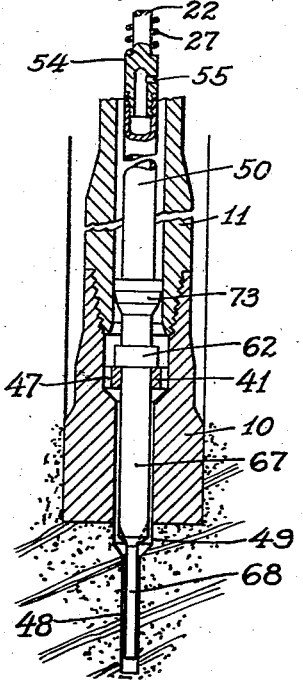
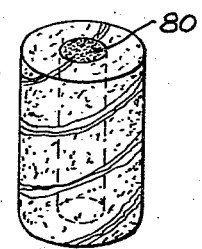
INVENTOR.
Philip H. Jones
BY Philip Subkow
ATTORNEY.

Patented Aug. 11, 1942

2,292,838

UNITED STATES PATENT OFFICE 2,292,838

METHOD AND APPARATUS FOR IMPARTING DIRECTIONAL MAGNETIC PROPERTIES TO CORE SAMPLES

Philip H. Jones, Redondo Beach, Calif., assignor to Union Oil Company of California, Los Angeles, Calif., a corporation of California Application December 6, 1938, Serial No. 244,231

6 Claims. (Cl. 255—1.4)

This invention relates to core drilling and particularly to the determination of the orientation of drilled earth formation core samples such as that, for example, obtained in oil well drilling practice.

The successful orientation of core samples by magnetic polar determinations has been dependent upon the presence of sufficient natural magnetic material in the cored formation to impart anisotropic susceptibility or magnetic polarization to the core samples recovered therefrom. Many such cored formations are found to contain sufficient connate magnetic material to exhibit definite and easily detectable anisotropic magnetic properties and this anisotropy is believed to have been originally established by the orienting effect of the presence of the terrestrial magnetic field during the sedimentation or precipitation of the magnetic particles comprising the subsequently consolidated formation, or to be the later result of the magnetizing influence of the terrestrial magnetic field acting upon the magnetic particles already present within the formation over long geologic periods of time.

Some formation core samples, however, exhibit such weak and indefinite anisotropic magnetic properties or polarities as to make their detection with accuracy difficult.

It is accordingly an object of this invention to artificially impart increased magnetic anisotropy to the portions of the formations to be cored whereby magnetic polar orientation determinations of cored formation samples otherwise having insufficient natural magnetic properties can be successfully determined and whereby such determinations of all cored samples whether possessing sufficient natural magnetic anisotropy or not can be greatly facilitated.

The invention resides broadly in introducing a liquid or plastic cementitious material possessing magnetic properties or containing finely divided magnetic materials into a portion of the formation to be cored whereby such introduced materials may set or solidify in place in the formation while under the influence of the terrestrial magnetic field and whereby the said magnetic materials may orient themselves under the magnetic force thereof and thus impart to the resultant set mass definite and permanent anisotropic magnetic properties which persist and are readily detectable upon subsequent recovery with the cored formation sample.

Other objects and features of novelty will be evident hereinafter.

In the drawing which illustrates a preferred embodiment of the invention, Figure 1 is a partial cross-sectional elevation of a core bit and drill collar in the bottom of a well borehole with the pilot drill in operating position therein.

Figure 2 shows the apparatus of Figure 1 with the injector in position in the drill collar.

Figure 3 shows the apparatus of Figure 1 with the retractable core cutter and core barrel in operating position in the drill collar and core bit.

Figure 4 is an enlarged detailed cross-sectional elevation of the injector mechanism of Figure 2.

Figure 5 is an enlarged perspective view of a typical core sample.

Referring to the drawing, 10 is preferably a three or four bladed core bit head, and 11 is a special drill collar, of a well known type adapted to operate in conjunction with a retractable type of core barrel, such for example, as a Reed Roller Bit Company's Reed B-R. drilling bit with wire line retractable core barrel. A tool joint box 12 is screwed into the top end of the said drill collar 11 and adapted to make connection with the tool joint pin 13 of the supporting drill stem. The tool joints and drill stem employed herewith are of the full hole type.

In place in the drill collar 11 and core bit head 10 is a pilot bit assembly comprising a pilot bit 16 of relatively small diameter extending below the blades of the core bit head and attached to a pilot bit shank 17 of larger diameter which extends upward through the core bit head and is secured at the top at 18 by suitable threads to the lower end of an elongated cylindrical body 20 which may be a standard retractable core barrel assembly. The said cylinder or core barrel assembly 20 in turn comprises a hollow barrel 21 having threads 18 at the lower end and an upwardly extending plunger 22 of reduced diameter at the upper end adapted to slide upwardly through a keyed slip joint 24 into the upper tubular carrier body member 25. The keyed slip joint is adapted to prevent relative rotation between the plunger 22 and the body member 25. A spiral spring 27, acting under compression normally maintains the plunger and associated apparatus in an extended position as shown in Figure 1.

At the upper end of the carrier body 25 is a dog 29 pivoted at 30 and adapted to swing out through a side slot in the body under the force of a spring 31 to form a latch. A suitable slotted recess is provided in the lower off-set edge of the bottom end 32 of the tool joint box 12 adapted to receive the dog latch 29. The assembly is thus retained in place within the drill collar and held against relative rotation by the action of the said dog latch 29 in the slotted recess and under the compression force of spring 27. Within the top of the carrier body 25 is a slidable spear head pull-bar 34 having at its top extension a spear head 35 and near its lower end a cross pull-bar pin 37 which engages at its ends the eliptical openings 39 of the said dog latch 29. An upward pull upon the spear head is transmitted through the slidable pull-bar 34 and pin 37 to the upper sloping surface of the opening 39, thereby causing the dog 29 to pivot counterclockwise about pin 30 and to retract into the carrier body out of contact with the latch slot 32, thus freeing the apparatus to move upward within the drill collar and drill pipe.

At the bottom end of the core barrel 21, as stated hereinbefore, are threads 18 to which the pilot bit shank 17 is attached. In the pilot drilling assembly of Figure 1, the said shank 17 closes the barrel 20 at the lower end so that the barrel performs no other service than to guide and retain the pilot bit in drilling position within the core bit head. The core bit head 10 is provided with a slush ring 41 which limits the downward movement of the barrel 20 and pilot bit 16 by contacting the pilot bit shank collar 42 which is slightly larger in diameter. Perforations 47 are provided in the slush ring to permit drilling fluid to by-pass from the drill collar to the core bit head.

Sufficient clearance is provided between the pilot drill shank and core head to allow a portion of the drilling fluid to flow therebetween from the drill stem to the cutting surfaces of the said core head. A drilling fluid circulation duct is also provided through the shank 17 and bit 16, the inlet of which is shown at 43 and the outlet of which is shown at 44 adjacent the cutting blades of the pilot bit.

The pilot bit shank 17 is provided, at the lower end at the junction point of the pilot bit, with a pair of sloping blades 45 and 46 to drill in the formation a conical shaped enlarged entrance as shown at 49 to the pilot bore hole 48.

In the lower portion of Figure 2 a retractable cement injector is shown in place in the beforementioned drill collar 11 and core bit head 10. The lower portion of the injector device is also shown in more detail in the enlarged sectional view of Figure 4.

Referring to Figures 2 and 4, the upper portion of the injector is identical with that hereinbefore described in connection with the retractable pilot bit mechanism of Figure 1. The lower portion of the injector comprises a barrel 50, located in the position occupied by the barrel 21 of Figure 1 and adapted to contain charges of cementitious material 51 and wash liquid 52 therein separated by means of a frangible partition 53, which may consist of a suitably treated disc of heavy paper, cardboard or fiberboard. The upper end of the barrel 50 is closed by and makes a threaded connection with the cylindrical head 54, which forms the lower end of the plunger rod 22. The passageway 55 is provided through the head 54 through which the drilling fluid under pressure in the drill stem and drill collar can gain access to the upper end of the barrel 50 above the cylindrical stop-plug 57. The stop-plug 57 is provided with a leather packing cup 58 at the upper end and a conical packer 59 at the lower end thereof, the said stop-plug being adapted to slide downward through the barrel under drilling fluid pressure to the conical seat 65.

The lower end of the barrel 50 terminates in a threaded connection 61 to which is screwed a threaded coupler 62, containing a spring-operated ball check valve as shown at 63 in the lower portion thereof. In the upper portion of the coupler 62 is provided a conical seat 65 adapted to form a fluid-tight seal with the beforementioned conical packing 59 on the stop plunger 57. Extending from the lower screwed connection 66 of the coupler 62 is the shank 67 of the injector tube 68, and the shank 67 and injector tube 68 are provided with central fluid ducts 69 and 70 respectively leading through the passageway 71 in the coupler 62 from the barrel 50. Surrounding the lower end of the barrel 50 a cup-shaped packer 73 is provided and adapted to make a fluid-tight seal between the barrel 50 and the bore of the drill collar 11. The downward thrust of the spring 27 and the weight of the injector is as in the case of the apparatus in Figure 1, also supported by means of the off-set collar portion 74 of the coupler 62 upon the slush ring 41.

Referring now to Figure 3, the core barrel 21 and the apparatus thereabove is identical to that shown and described for Figure 1, which is above and supported by the collar 42 upon the slush ring 41, but extending below the core barrel 21 and the collar 42 attached to threaded connection 18 is a core barrel extension 77 having a core catcher 78 therein near the lower end and terminating at the lower end in a standard core cutter as shown at 79.

Figure 5 illustrates the appearance of a short length of a typical core recovered by the apparatus as a result of the exercises of the method of this invention. The section of the core is cylindrical in shape having an external diameter corresponding to that of the core cutter 79, and contains a coaxial cylindrical body of cementitious material as shown at 80, having a diameter equal to that of the pilot bore hole as shown at 48.

The operation of the apparatus is as follows:

Assuming that conventional core drilling operations have been in progress and that it is now desired to obtain an oriented core sample, the retractable core bit and core barrel are then withdrawn from the drill stem by means of a wire line operated overshot and the before described mechanism carrying the pilot bit is next dropped into place in the drill collar 11 where it takes the position shown in Figure 1 but with the said drill collar and core bit 10 raised and suspended above the bottom of the hole a distance sufficient to allow the pilot bit 16 to extend its full length from the core head without touching the underlying formation to be drilled. When the said device of Figure 1 has thus fallen into place the dog 29 will automatically open under the force of the spring 41 and latch in the recess 32 at the lower off-set end of the tool joint box 12. The said device comprising the upper body 25, the plunger 22 and the barrel 20, together with the shank 17 and the pilot bit 16 will thus be secured against rotation and against upward movement within the said drill collar and bit.

Rotation of the drill pipe is then commenced and the whole assembly comprising the drill stem, collar and core head lowered until the lower end of the pilot bit 16 makes contact with the bottom of the drill hole. If the drill pipe 13, drill collar 11 and core bit 10 are then continued to be lowered at a rate greater than the drilling progress made by the pilot bit 16, sufficient upward thrust will be imposed upon the said pilot bit 16 to deflect the spiral spring 27 and allow the whole lower portion of the instrument to move upward into the drill collar against the force thereof. The length of the upper body 25 and the spring 27 is preferably made such that the core bit 10 can be deliberately lowered to the bottom of the bore hole 14, and the pilot bit 16 upon contact with the said bottom of the bore hole will be able to retract completely into the drill collar and core bit, thus making it impossible to put more weight upon the pilot bit than that required to compress the spring 27 and thereby eliminating the necessity of carefully gauging the amount of weight placed upon the pilot bit. After the core drill has thus been run to the bottom of the bore hole and if desired when the core head rests upon bottom, rotation may be commenced and the pilot bit 16 allowed to drill ahead into the underlying formation alone under the force of the compressed spring 27 without further lowering of the drill pipe as a whole. The proper drilling weight on the pilot bit 16 is thus automatically regulated which eliminates the possibility of damaging the pilot bit as would be likely to occur were the pilot bit fixed within the core drill and it thus became necessary to gauge the drilling weight applied to the pilot bit from the top of the drill stem.

When the core drill 10 is being rotated on the bottom and the pilot bit 16 has drilled into the underlying formation to the full length of the extension thereof under the force of the spring 27, the sloping cutter blades 45 and 46 finally come into contact with the formation, cutting a shallow conical depression of enlarged diameter as shown at 81 at the upper end of the pilot borehole 48.

This accomplished, a wire line and overshot is next lowered through the drill pipe to the spear head 35 to which it attaches itself and upon taking tension upon said spear head 35 through the wire line, the latch 29 is withdrawn from the recess 32 allowing the thus freed pilot drilling instrument to be withdrawn to the surface through the drill pipe. Following this, the injector device as shown in Figure 4 is next dropped through the drill pipe into the drill collar 11 and core bit 10 to the position shown in Figure 2, whereupon it latches in place in the manner hereinbefore described and illustrated in connection with the pilot drilling mechanism of Figure 1. With the core bit 10 resting on the bottom and the injector tube 68 thus inserted in the pilot hole 48, pressure is next applied to the drilling fluid in the drill pipe. The packer 79 surrounding the barrel 50, prevents the flow of the said drilling fluid past the injector instrument resulting in a differential pressure around the instrument. The said fluid differential pressure is transmitted to the top of the stop-plug 57 by way of the passage 55 in the head 54 and the stop-plug under the force of the drilling fluid is forced downward expelling first the wash liquid 52 and then the cementitious material 51 by way of the passages 69 and 70 of the shank 67 and injector tube 68 into the pilot borehole 48. The volume of the charges of wash liquid 52 and the cementitious material 51 are measured and controlled so that the inside surfaces of the pilot borehole 48 is first washed by the wash liquid and then expelled from the pilot borehole and completely displaced with the charge of cementitious material following. The said cementious material upon being discharged from the lower end of injector tube 68 rises in the surrounding annular spaces in the pilot borehole 48 and flows to the top thereof and fills the conical shaped bore 49. When all of the cement charge 51 has been expelled, the stop-plug 57 will have travelled down the full length of the barrel 50 and will come to rest with the conical packer 59 upon the conical seat 65 of the coupler 62 thus preventing further flow of cement and drilling fluid. This will be evidenced by a rise in the drilling fluid pressure at the pumps at the well surface. The cementitious charge thus having been injected into the pilot borehole, the injector tube is next withdrawn from the pilot borehole 48 by raising the core bit and drill collar off the bottom a sufficient distance to allow the cementitious material in and surrounding the conical bore 81 to flow back into the space in the pilot borehole 48 evacuated by the withdrawal of the said injector tube 68.

The cementitious material in the pilot borehole 48 is then allowed to remain until set and during this setting period the injector apparatus is withdrawn from the drill collar by means of the wire line as herein above described in connection with the pilot drilling mechanism.

Following this a standard retractable core barrel and core cutter are dropped into the drill pipe and allowed to come to rest in a position as shown in Figure 3. The core barrel is then locked into position in the same manner as that described in connection with the pilot drilling mechanism of Figure 1. Core drilling operations are then continued and cores taken of the underlying formation containing the cementitious material which has been allowed to set in the pilot borehole 48. After sufficient coring has been carried on, the retractable core barrel containing the cores is withdrawn from the drill pipe by means of the wire line overshot in the manner hereinbefore described. Sections of the cored formation thus recovered resemble that shown in Figure 5, the outside diameter thereof corresponding to the internal diameter of the core cutter 79 and the central cylinder of cementitious material 80 corresponding in diameter to that of the pilot borehole 48.

The injector device of Figure 4 described hereinbefore, particularly barrel 50, coupling 62, and shank and tube 67 and 68 respectively, are preferably constructed of a non-magnetic metal such as, for example, stainless steel for the purpose of preventing possible segregation and adherence of the small magnetic particles, when such are employed in the cementitious material, as hereinafter described, upon the inside surfaces thereof.

The wash liquid which may be employed as the initial charge to be expelled from the barrel 50, which is shown as being confined therein at 52 between the frangible partition 59 and the check valve 63 may comprise any suitable liquid preferably adapted to deflocculate the drilling mud and to thus cause the removal of a substantial portion of the mud cake formed on the walls of said pilot borehole and at the same time to expel the same from the pilot borehole in order to prepare the formation wall surfaces thereof for a good bond with the subsequently injected cementitious material. Suitable wash liquids for this puropse which may be employed are: water, sodium tetraphosphate, sodium bicarbonate, sodium carbonate, calcium chloride, hydrochloric acid and the like agents adapted to remove the mud cake formed on the pilot borehole walls during drilling.

Cementitious material, having magnetic properties and which is suitable to be injected into the borehole and the charge of which is shown in place in the injector barrel 50, between the frangible partition 53 and the stop-plug 57, may comprise a quick-setting Portland cement or the like containing finely divided ferromagnetic particles mixed therewith or in suspension therein. Other cementitious materials which may be similarly employed are plaster of Paris, magnesium-oxychloride, and the like. Such ferromagnetic particles contained in the cement may comprise finely graded iron or steel filings, finely divided permalloy or other suitable highly ferromagnetic alloys or powdered magnetic iron oxide.

The final magnetic polar determinations of formation core samples processed and recovered in accordance with the hereinbefore described method may be determined in accordance with well known test methods, for example, the teachings of the patents to Herrick, 1,792,391, and Hering et al. 2,105,650.

The foregoing is merely illustrative of a preferred method and embodiment of the invention and is not to be considered limiting since many variations may be made by those skilled in the art within the scope of the appended claims.

I claim:

1. A method of imparting magnetic properties to formation core samples comprising the steps of drilling a borehole to the formation to be cored, drilling a pilot hole of smaller diameter than the core to be taken at the end of said borehole, positively displacing drilling mud from said pilot hole by positively injecting a wash liquid thereinto, positively displacing said wash liquid from said pilot hole by positively injecting a magnetic cementitious material thereinto and allowing it to remain undisturbed until set, and coring ahead and removing a core sample of said formation containing a portion of said injected magnetic cementitious material.

2. Apparatus for imparting magnetic properties to formation core samples comprising in combination, means to drill a borehole to the formation to be cored, means to drill a pilot hole of smaller diameter than the core to be taken at the end of said borehole, means adapted to be introduced into the pilot hole to inject fluent, magnetic material into said pilot hole, means to cut a core sample from said formation concentric with and including a portion of said pilot hole, and means to recover said core sample from said bore hole.

3. Apparatus for imparting magnetic properties to formation core samples comprising in combination, means to drill a borehole to the formation to be cored, means to drill a pilot hole of smaller diameter than the core to be taken at the end of said borehole, means to positively displace drilling fluid from the said pilot hole, means to inject a cementitious material positively thereinto, and means to cut and recover a core sample from said formation containing a portion of said pilot hole and its cemented contents.

4. Apparatus according to claim 2 in which the means to drill said pilot hole comprises a pilot bit retractable through the core drill and the drill stem.

5. Apparatus according to claim 2 in which the means to inject magnetic material into the pilot hole comprises a barrel adapted to contain a charge of fluid or plastic material and adapted to be lowered into the borehole, a tubular extension on the lower end of said barrel and adapted to extend into the pilot hole, and means to forcibly expel the contents of said barrel through said tubular extension and into said pilot hole.

6. Apparatus for imparting magnetic properties to formation core samples comprising in combination, means to drill a bore hole to the formation to be cored, means to drill a pilot hole of smaller diameter than the core to be taken at the end of said borehole, means to inject a cementitious material into said bore hole, and means to cut and recover a core sample from said formation containing at least a portion of the cemented contents in said bore hole, said means to inject cementitious material into the pilot hole comprising a barrel adapted to contain a charge of fluid or plastic material and adapted to be lowered into a retractable core barrel type of drill collar, a tubular extension on the lower end of said barrel and adapted to extend through the core bit and into the pilot hole and means to forcibly expel the contents of said barrel through said tube and into said pilot hole.

PHILIP H. JONES.